United States Patent
Du (10) Patent No.: US 12,483,551 B2
(45) Date of Patent: Nov. 25, 2025

(54) NETWORK ACCESS AUTHENTICATION METHOD AND ASSOCIATED SYSTEM

(71) Applicant: GE Precision Healthcare LLC, Wauwatosa, WI (US)

(72) Inventor: Xizhen Du, Beijing (CN)

(73) Assignee: GE Precision Healthcare LLC, Wauwatosa, WI (US)

( * ) Notice: Subject to any disclaimer, the term of this patent is extended or adjusted under 35 U.S.C. 154(b) by 377 days.

(21) Appl. No.: 17/955,204

(22) Filed: Sep. 28, 2022

(65) Prior Publication Data

US 2023/0097318 A1 Mar. 30, 2023

(30) Foreign Application Priority Data

Sep. 28, 2021 (CN) .......................... 202111143994.9

(51) Int. Cl.
*H04L 9/40* (2022.01)
(52) U.S. Cl.
CPC .......... *H04L 63/0853* (2013.01); *H04L 63/20* (2013.01)
(58) Field of Classification Search
CPC ............................ H04L 63/0853; H04L 63/20
USPC ........................................................ 726/17
See application file for complete search history.

(56) References Cited

U.S. PATENT DOCUMENTS

| | | | |
|---|---|---|---|
| 10,063,543 B2 | 8/2018 | Alonso Cebrian | |
| 10,740,758 B2 | 8/2020 | Dutt | |
| 2017/0374070 A1 | 12/2017 | Shah | |
| 2020/0134599 A1* | 4/2020 | Koeppel | G06Q 20/3224 |
| 2020/0327458 A1 | 10/2020 | Dutt | |
| 2021/0158492 A1* | 5/2021 | Quan | G06T 5/50 |
| 2022/0417302 A1* | 12/2022 | Saxena | H04L 65/1045 |

FOREIGN PATENT DOCUMENTS

JP 63210152 A 1/2016

\* cited by examiner

*Primary Examiner* — Anthony D Brown (57) ABSTRACT

A network access authentication method including: receiving a connection authorization request from an authorizing device, the connection authorization request comprising identification information of a remote device to be authorized and identification information of a network to be accessed; sending the connection authorization request to the remote device; receiving a response message from the remote device; and assigning a virtual network server and generating a security rule on the basis of the connection authorization request, wherein the assigned virtual network server is configured to apply the security rule to establish a virtual network connection with the remote device and the network to be accessed.

19 Claims, 6 Drawing Sheets

NETWORK ACCESS AUTHENTICATION METHOD AND ASSOCIATED SYSTEM

PRIORITY

This application is based on and claims priority to Chinese Patent Application No. 202111143994.9, filed on Sep. 28, 2021 in the China National Intellectual Property Administration Office, the disclosure of which is incorporated herein by reference in its entirety

TECHNICAL FIELD

Embodiments of the present disclosure generally relate to remote access network authentication, and relate in particular to a network access authentication method and system, a computer-readable storage medium, a remote interaction system for a medical imaging system, and a virtual private network (VPN).

BACKGROUND

In the medical field, regarding remote assistance of imaging devices, one of the main problems faced at present is how to guarantee the security and convenience of medical data and device data transmission in a remote interaction process.

There are no established specifications for remote assistance of imaging devices such as CT and MM, and in some scenarios, video software running over the Internet, such as social software video and third-party conference software, is used to achieve the purpose of device sharing. However, this solution cannot achieve interconnection and intercommunication between devices, resulting in ineffective telemedicine performance.

In some telemedicine scenarios, conventional virtual private network modes are used to perform interaction. However, due to insufficient network security management, many technical or management vulnerabilities are exposed when a telemedicine network channel is established. For example, according to a conventional VPN access scheme, regardless of whether a verification system uses multi-factor verification (such as a certificate, password, or RSA), an access requester can complete all authentication processes by themselves. For instance, the access requester may access a hospital network at any time according to a password, certificate, temporary token, etc. assigned thereto without being perceived by the hospital in real time. In such access mode, security control over hospital networks and imaging devices is compromised, and the devices may be controlled without authorization, thereby exposing both patients and hospital equipment to huge potential security hazards.

SUMMARY

According to an aspect of the present disclosure, a network access authentication method may include:
  receiving a connection authorization request from an authorizing device, the connection authorization request comprising identification information of a remote device to be authorized and identification information of a network to be accessed;
  sending the connection authorization request to the remote device;
  receiving a response message from the remote device; and
  assigning a virtual network server and generating a security rule on the basis of the connection authorization request, wherein the assigned virtual network server is configured to apply the security rule to establish a virtual network connection with the remote device and the network to be accessed.

According to another aspect of the present invention, a computer-readable storage medium storing one or more instructions therein, that, when executed by a processor, may implement the network access authentication method according to respective aspects of the present disclosure.

According to yet another aspect of the present invention, a network access authentication system may include:
  an authentication module configured to: receive a connection authorization request from an authorizing device, send the connection authorization request to a remote device, and receive a response message from the remote device, the connection authorization request comprising identification information of the remote device to be authorized and identification information of a network to be accessed; and
  a resource scheduling module configured to: receive the connection authorization request sent by the authentication module, and assign a virtual network server and generate a security rule on the basis of the connection authorization request, wherein the assigned virtual network server is configured to apply the security rule to establish a virtual network connection with the remote device and the network to be accessed.

Further provided in another aspect of the present invention is a remote interaction system for a medical imaging system, the medical imaging system comprising a medical imaging device and a computer device configured to control the medical imaging device, the computer device being connected to a local network to be accessed, and the remote interaction system comprising:
  the above network authentication system; and
  a virtual network server assigned by the resource scheduling module, and configured to establish a virtual network on the basis of the security rule and to process an interaction task between the remote device and the computer device in the network to be accessed.

Further provided in another aspect of the present invention is a virtual private network, comprising:
  an authentication module configured to: receive a connection authorization request from an authorizing device, send the connection authorization request to a remote device, and receive a response message from the remote device, the connection authorization request comprising identification information of the remote device and identification information of a local network; and
  a private network generation module configured to: receive the connection authorization request sent by the authentication module, generate a security rule on the basis of the connection authorization request, and apply the security rule to establish a virtual private network between the remote device and the local network.

BRIEF DESCRIPTION OF THE DRAWINGS

These and other features, aspects, and advantages of the present disclosure will be better understood by reading the following detailed description with reference to the accompanying drawings, where the same reference signs are used to represent the same components throughout the accompanying drawings, in which.

DETAILED DESCRIPTION

Specific embodiments of the present disclosure will be described in detail below with reference to the accompanying drawings in order to assist those skilled in the art to understand exactly the presently disclosed subject matter. In the following detailed description of these specific embodiments, the present specification does not describe in detail any of the known functions or configurations to prevent unnecessary details from affecting the present disclosure.

Unless defined otherwise, technical terms or scientific terms used in the claims and specification should have usual meanings understood by those of ordinary skill in the technical field to which the present disclosure. Terms such as "first" to "third" and similar words used in the present specification and claims do not denote any order, quantity, or importance, but are only intended to distinguish different constituents. The terms "one" or "a/an" and similar terms do not denote a limitation of quantity, but rather the presence of at least one. "Comprising," "having," "including," and similar words mean that the elements or articles appearing before "comprising," "including," or "having" include the elements or articles and their equivalent elements appearing behind "comprising," "including," or "having," not excluding any other elements or articles. "Connect" or "connected" and similar words are not restricted to physical or mechanical connections, but may also include electrical and network communication connections, whether direct or indirect.

Figure 1:
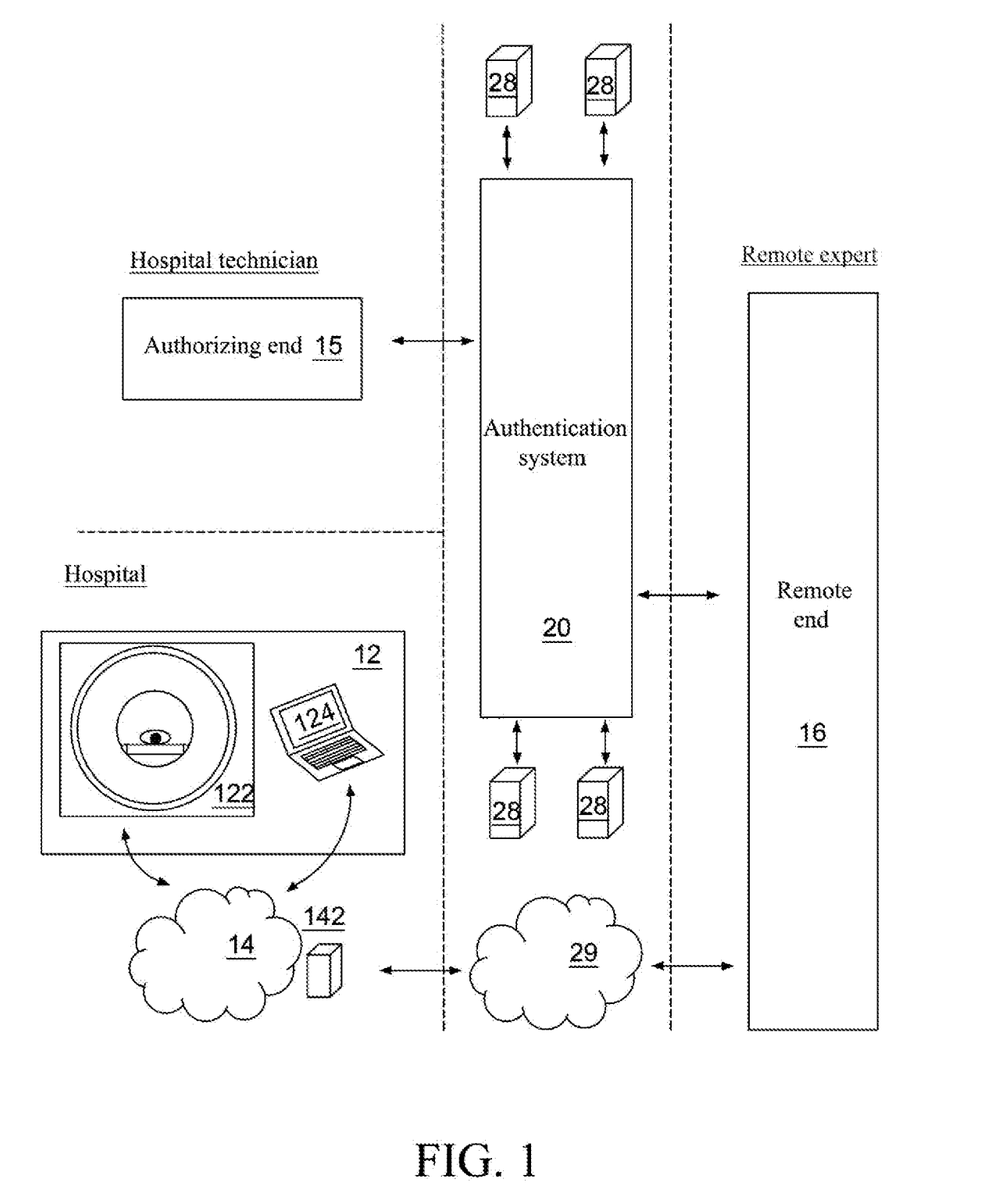
FIG. 1 shows a schematic structural block diagram of a remote interaction system for a medical imaging system according to an embodiment.

FIG. 1 shows a schematic structural block diagram of a remote interaction system for a medical imaging system according to an embodiment, in which a medical imaging system 12 is shown. The medical imaging system 12 may include one of the following systems, such as computed tomography (CT), magnetic resonance imaging (MRI), X-ray imaging, C-arm X-ray imaging, vascular machine imaging, positron emission computed tomography (PET), etc, and may also include a multi-modality imaging system including a combination of the multiple imaging systems described above.

As shown in FIG. 1, the medical imaging system 12 may include a medical imaging device 122 and a computer device 124 configured to control the imaging device. In conventional application scenarios, the computer device 124 may control the medical imaging device 122 to scan and image an object to be imaged (e.g., a patient) on the basis of an operation performed by a local user (e.g., a radiologist). In one example, the medical imaging device 122 may be a scanning device placed in a local hospital scan room. The computer device 124 may be a control apparatus placed in an operating room isolated from the scan room. The computer device 124 and the scanning device 122 may communicate through a local network 14 (i.e., a network to be accessed) to perform interaction for imaging control.

When an expert, for example, is needed for telemedicine assistance, the expert may access the local network 14 from a remote end 16 to interact with the computer device 124 therein. According to an embodiment, the remote end 16 may include a device such as a computer or tablet computer. The remote end 16 and associated device may be operated by one or more remote users.

The local network 14 may include an edge device 142 configured to provide an entry point to access the local network 14 for an external device (such as the remote device). The edge device 142 may include, for example, a router, a routing switch, etc., and may, for example, translate between different network protocols.

The remote interaction system may further include a network access authentication system 20 and a plurality of virtual network servers 28. The network access authentication system 20 may be configured to authorize and authenticate a party to be authorized to access the local network 14 from the outside (e.g., the remote end 16), and to assign a network server 28 so as to generate a virtual network 29. The edge device 142 may only allow authorized and authenticated users to access the local network 14. An authenticated user at the remote end 16 may access the local network 14 via the virtual network 29 to remotely operate the medical imaging system 12 connected to the local network 14.

The plurality of virtual network servers 28 may include a distributed server for providing cloud access points. The authentication system 20 may also be disposed in a server of the cloud network.

Figure 2:
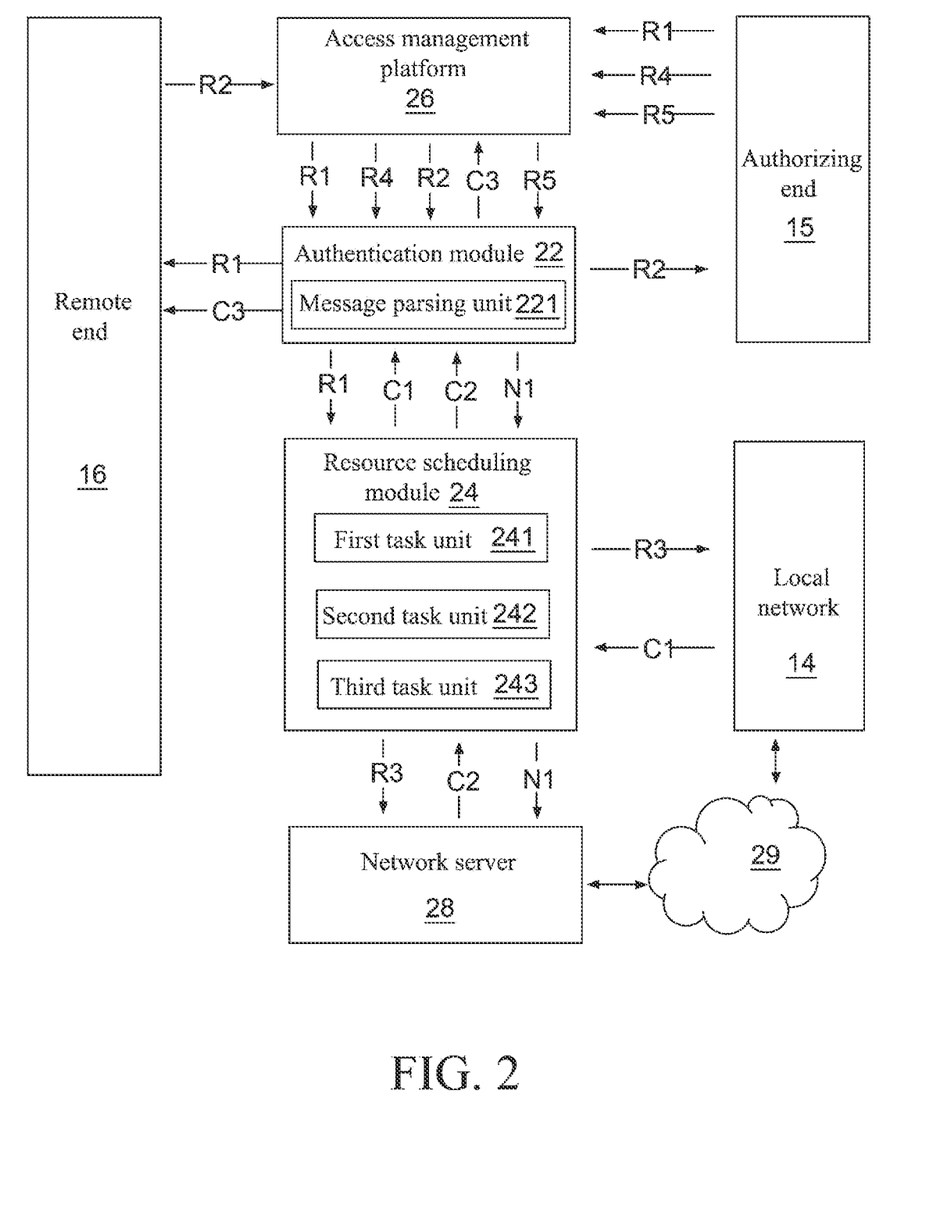
FIG. 2 shows a schematic structural block diagram of a network access authentication system according to an embodiment.

FIG. 2 shows a schematic structural block diagram of the network access authentication system 20, according to an embodiment. As shown in FIG. 2, the network access authentication system 20 includes an authentication module 22 and a resource scheduling module 24. The authentication module 22 and the resource scheduling module 24 may be integrated in the same server or separately disposed in different servers. The authentication module 22 is configured to receive a connection authorization request R1 from an authorizing end 15. In this embodiment, an radiologist or a technician at the authorizing end 15 may operate a computer device located within or outside the local network 14, so as to generate and send the connection authorization request R1. According to an embodiment, the authorizing end 15 may include a remote device such as a computer or tablet computer. The authorizing end 15 and associated device may be operated by one or more remote users.

In one embodiment, the authentication module 22 receives the connection authorization request R1 from the authorizing end 15 through an access management platform 26. The access management platform 26 may be a user interface disposed based on a web browser or application. For example, a user at the authorizing end 15 may access the access management platform 26 through the browser or application, and input a command related to the connection authorization request R1 into the access management platform 26, so as to generate the connection authorization request R1 at the management platform 26. The management platform 26 then sends the generated connection authorization request R1 to the authentication module 22 for relevant authentication.

In one embodiment, the connection authorization request R1 includes identification information of the remote end 16 to be authorized and identification information of the network to be accessed (e.g., the local network 14). The identification information of the remote end 16 may include, but is not limited to, identity information for identifying a remote end user, IP address information, communication information, etc. The identification information of the network to be accessed may include at least one of the following: identity information of an authorizing party, attribute information of the network to be accessed (e.g., network configuration information including an access port, routing information, etc.), and information of a device in the network to be accessed (e.g., the edge device, the imaging device of the medical imaging system, and the computer device, etc.).

In other embodiments, the connection authorization request R1 may further include access time information, the access time information including at least one of a start time and an end time between which the remote end 16 is allowed to have a virtual network connection to the network to be accessed.

The authentication module 22 may be further configured to send the received connection authorization request R1 to the remote end 16. Similarly, the authentication module 22 may transmit, via the access management platform 26, the received connection authorization request R1 to a remote end user who is also accessing the access management platform 26.

In other embodiments, the authentication module 22 may also directly send the connection authorization request R1 to the remote end 16.

In one example, the authentication module 22 may include a message parsing unit 221 configured to parse the connection authorization request R1 received from the authorizing end 15, and to send the parsed connection authorization request R1 to the remote end 16 via, for example, one or more of a mail, an SMS short message, and intra-website information.

The authentication module 22 may be further configured to receive a response message R2 from the remote end 16. In one embodiment, the authentication module 22 receives the response message R2 through the access management platform 26. In one exemplary scenario, a user at the remote end 16, after receiving the connection authorization request R1, may access the access management platform 26 to make a response. The response message R2 may indicate consent to remotely accessing the local network 14 in accordance with the specifics of the connection authorization request R1. By means of the access management platform 26, a user interface is provided for users at both ends of the network and enables the users to communicate with the authentication module 22, such that the users can perform secure remote connections through simple operations, thereby achieving real-time remote assistance in the field of medical imaging.

The resource scheduling module 24 is configured to receive the connection authorization request R1 sent from the authentication module 22, and to assign a virtual network server 28 and generate a security rule R3 on the basis of the connection authorization request R1. The assigned virtual network server 28 may be configured to apply the security rule R3 to establish a virtual network connection with the remote end 16 and the network to be accessed (e.g., the local network 14).

The "security rule" may include a rule that needs to be followed when the edge device 142 of the local network 14 accesses the virtual network, and may further include a rule that needs to be followed when the remote end 16 is allowed to access the virtual network. The security rule may include at least part of the content of the connection authorization request R1, and may further include network configuration information. For example, the security rule R3 may include an IP address of the remote end, an access port of the local network 14, routing information corresponding to the computer device 124 that needs to be connected, etc. The security rule R3 may further include information of the time during which the remote end 16 is allowed to access the local network.

In one example, the resource scheduling module 24 is in network communication with the plurality of virtual network servers 28 and sends a task scheduling command to the virtual network servers. Each virtual network server 28 establishes a connection with an external network in accordance with the received task scheduling command, for example, allowing the local network 14 to access a corresponding virtual network and allowing a remote end user to access the virtual network, such that the remote end user can access the local network 14.

In one example, the resource scheduling module 24 receives a plurality of connection authorization requests sent by the authentication module 22, and generates a connection authorization request list. In addition, the resource scheduling module 24 receives status update information from each virtual network server 28. Thus, the resource scheduling module 24 can generate a scheduling plan on the basis of the status of each network server (e.g., idle or busy), and assign the virtual network according to the scheduling plan.

In the above embodiments, an authorized connection may be established on the basis of a connection authorization request initiated by the authorizing party. Since the connection authorization request initiated by the authorizing party includes identification information of the remote end to be authorized, compared with conventional connection authentication techniques, the present networking technique is more accurate and secure, and avoids network security problems caused by non-specified users randomly accessing the network of the authorizing end.

The resource scheduling module 24 may generate the security rule R3 on the basis of the connection authorization request, such that the network server applies the security rule in remote connection, further guaranteeing network security in a network connection process.

On the basis of the above description, the security rule R3 generated by the resource scheduling module 24 may further include a prescribed time period, such as at least one of a start time and an end time between which the remote end 16 is allowed to access the network to be accessed.

Time information for authorized access may be further defined in the connection authorization request R1, so as to avoid network security problems caused by an authorized party accessing the local network outside the allowed time period.

In order to further improve the security of network connections, the authentication module 22 may be further configured to receive an access permission instruction R4 from the authorizing end 15. The access permission instruction R4 can be generated by the authorizing end 15 when accessing the access management platform 26. The authentication module 22 may be configured to send the access connection request R1 to the resource scheduling center 24 when the authentication module receives the access permission instruction R4 from the authorizing end 15.

In one example, the access management platform 26 is configured to add a currently received access permission instruction R4 as an instruction tag to an earlier received access connection request R1, so as to send the access connection request R1 provided with the instruction tag to the authentication module 22.

Further, the authentication module 22 may be configured to receive the above access permission instruction only within a particular time (e.g., five minutes) before an access start time of the connection authorization request.

In one embodiment, the resource scheduling module 24 may include a first task unit 241, a second task unit 242, and a third task unit 243. The first task unit 241 is configured to instruct the edge device 142 of the network to be accessed 14 to update a network configuration (such as configuring an access port and routing information) in accordance with the security rule R3, and to receive, from the edge device 142, a first confirmation message C1 indicating that the network configuration has been updated. The second task unit 242 is configured to receive, from an assigned virtual network server 28, a second confirmation message C2 indicating that the security rule R3 has been applied. The third task unit 243 is configured to send the first confirmation message C1 and the second confirmation message C2 to the authentication module 22, so as to notify the authentication module 22 that establishment of a remote connection is ready.

The authentication module 22, after receiving the first confirmation message C1 and the second confirmation message C2, generates access authentication information for accessing the network to be accessed 14, so as to allow the remote end to access the local network 14 via the virtual network 29 on the basis of the access authentication information. The access authentication information may include detailed information for accessing the local network 14, such as routing information.

The authentication module 22 may further send the generated access authentication information to the remote end 16 in the form of, for example, a mail, an SMS short message, intra-website information, or the like. In one example, the authentication module 22 sends the access authentication information to the access management platform 26, such that when accessing the access management platform 26, a remote end user automatically acquires detailed information of remote access, and remotely accesses the network to be accessed 14 on the basis of the detailed information.

Upon establishing the remote connection, the computer device 124 in the local network 14 may receive a remote operation instruction from the remote end 16 through the virtual network 29, and performs an operation related to medical imaging. In one example, said operation enables the medical imaging device 122 to perform a corresponding medical imaging scan or enables the computer device 124 to perform corresponding processing.

In other embodiments, the authentication module 22 is further configured to receive a connection termination request R5 from the authorizing end 15 through the access management platform 26, and to send a connection termination instruction N1 to the resource scheduling module 24 on the basis of the received connection termination request. The resource scheduling module 24 is configured to send the connection termination instruction N1 to the assigned virtual network server 28, such that the virtual network server 28 terminates the network connection with the remote end 16.

Specifically, the authentication module 22, after receiving the connection termination request from the authorizing end 15, may delete a generated authorized connection authentication, and sends the connection termination instruction to the corresponding virtual network server through the resource scheduling module 24, such that the virtual network server 28 terminates the network connection with the remote end 16, until the authorized connection authentication is regenerated on the basis of an operation performed at the authorizing end 15.

On the basis of the above connection termination instruction, the virtual network server 28 may simultaneously terminate the network connection with the local network 14 and reset/delete the security rule R3.

Upon termination of connection, the virtual network server 28 may report to the resource scheduling module 24 a status update message, including a message that the remote connection has been released and the security rule has been reset. The resource scheduling module 24 may forward the status update message to the authentication module 22 and update a resource list on the basis of the status update message, for example, updating the status of the assigned virtual network server 28 to be idle such that said server can be reassigned. On the basis of the updated status, the resource scheduling module 24 can further update the scheduling plan.

The authentication module 22 may be further configured to send the received status update message to the access management platform 26, such that the authorizing end 15 and the remote end 16 can acquire the current remote connection status by accessing the access management platform 26.

At the same time, authentication module 22 may further send a notification of the remote connection termination to the remote end 16 and the authorizing end 15 via one or more of a mail, an SMS short message, and intra-website information.

On the basis of the received status update message, the authentication module 22 may further update an authorization list, for example, removing the relevant content of the above remote connection from the list or changing the status of the remote connection in the list.

The remote connection can be quickly and effectively terminated on the basis of the connection termination request unilaterally initiated by the authorizing end, and resource resetting can be carried out, such that when network security issues are suspected, the remote end is quickly and effectively prevented from continuing operating the devices in the local network.

Figure 3:
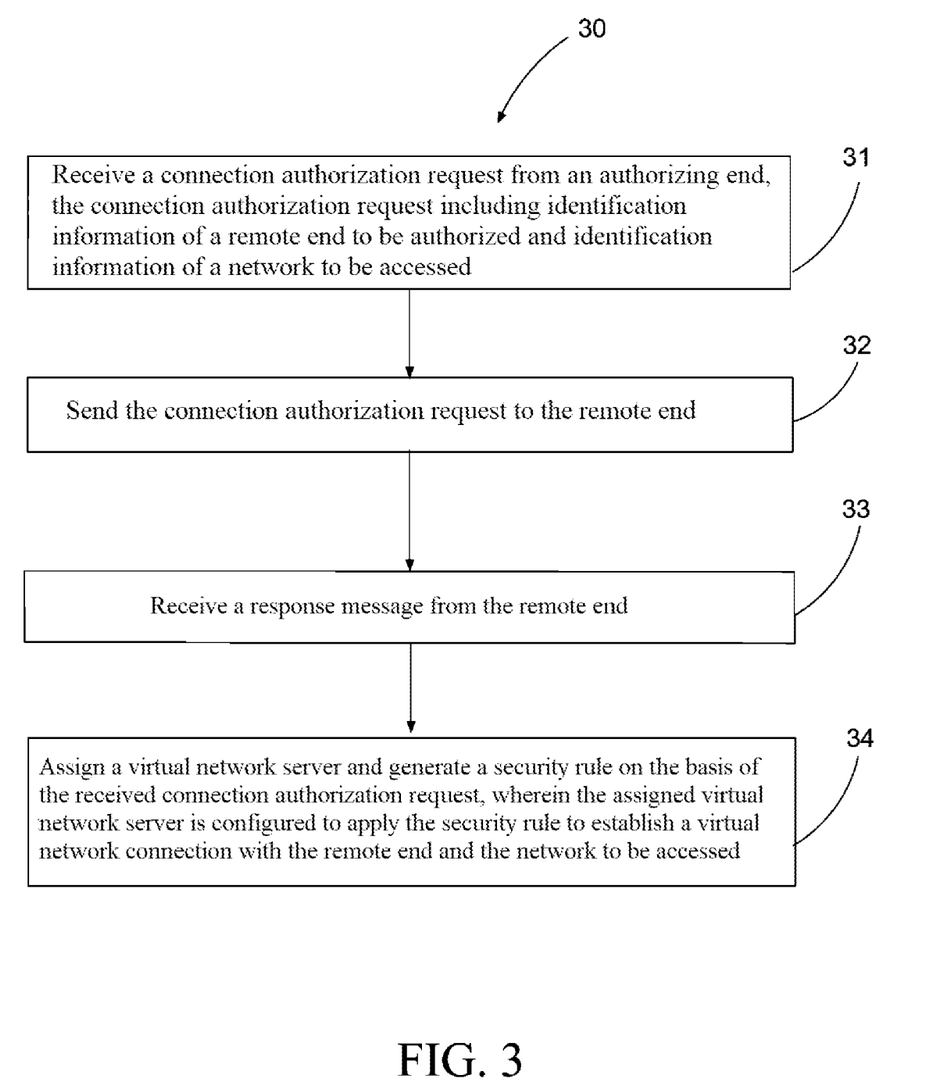
FIG. 3 shows a flowchart of a network access authentication method according to an embodiment.

FIG. 3 shows a flowchart 30 of a network access authentication method, according to an embodiment.

Operation 31 may include receiving a connection authorization request from an authorizing end, the connection authorization request including identification information of a remote end to be authorized and identification information of a network to be accessed;

Operation 32 may include sending the connection authorization request R1 to the remote end 16;

Operation 33 may include receiving a response message from the remote end; and

Operation 34 may include assigning a virtual network server and generating a security rule on the basis of the received connection authorization request, wherein the assigned virtual network server is configured to apply the security rule to establish a virtual network connection with the remote end 16 and the network to be accessed 14.

Further, the connection authorization request may further include access time information, the access time information including at least one of a start time and an end time between which the remote end 16 is allowed to have a virtual network connection to the network end to be accessed 14.

Further, the identification information of the network to be accessed may include at least one of identity information of an authorizing party, attribute information of the network to be accessed, and information of a device in the network to be accessed. The device may include at least one of the medical imaging device 122, the computer device 124 interacting with the medical imaging device 122, and the edge device 142.

Further, in operation 32, sending the connection authorization request to the remote end 16 may include: parsing the connection authorization request; and sending the parsed connection authorization request to the remote end 16 via one or more of a mail, an SMS short message, and intra-web site information.

Figure 4:
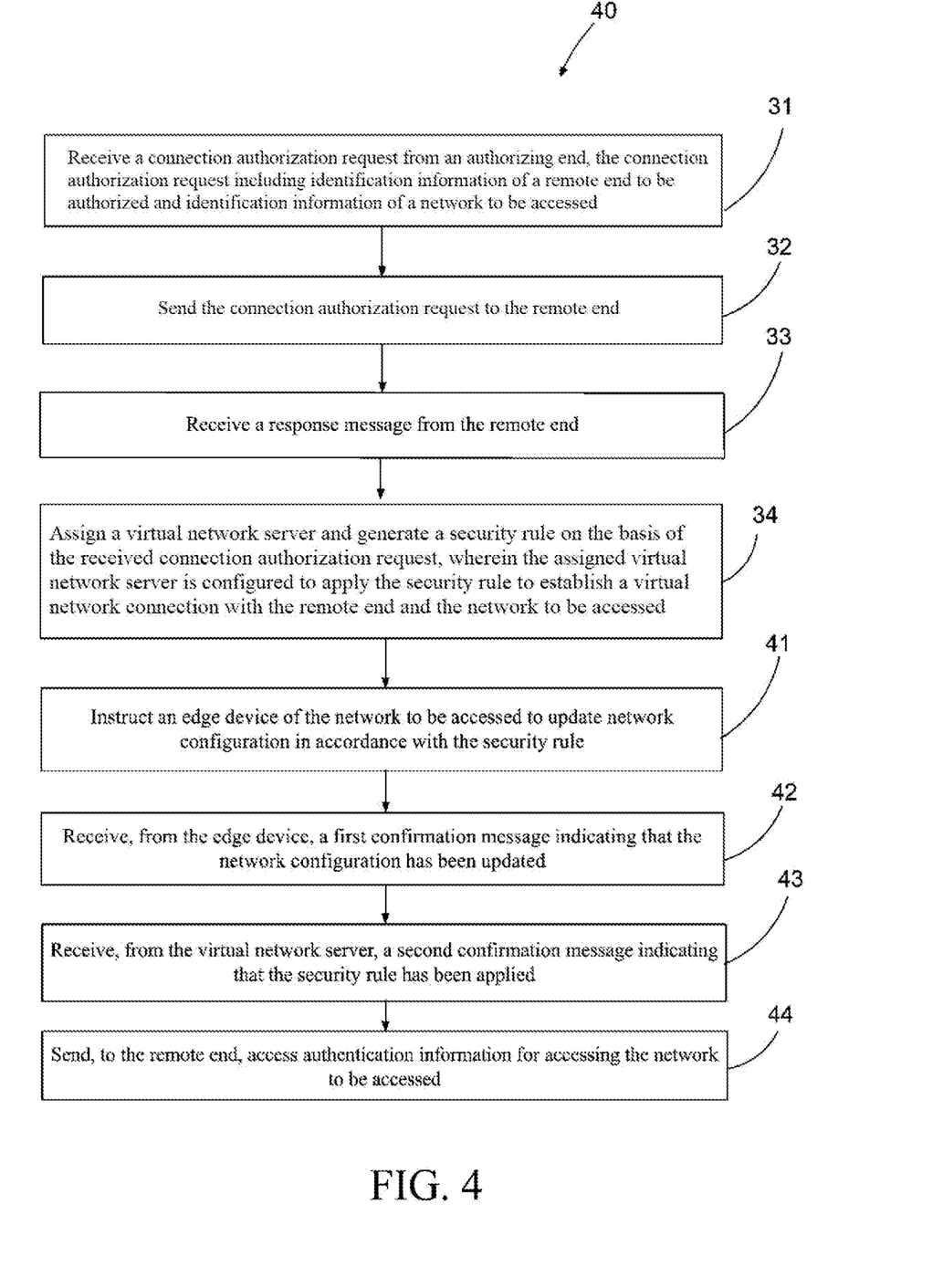
FIG. 4 shows a flowchart of a network access authentication method according to another embodiment.

FIG. 4 shows a flowchart 40 of a network access authentication method according to another embodiment. The method including operations 31-34, and further includes the following operation:

Operation 41 may include instructing an edge device of the network to be accessed to update a network configuration in accordance with the security rule;

Operation 42 may include receiving, from the edge device, a first confirmation message indicating that the network configuration has been updated;

Operation 43 may include receiving, from the virtual network server, a second confirmation message indicating that the security rule has been applied; and Operation 43 may include sending, to the remote end 16, access authentication information for accessing the network to be accessed 14.

Figure 5:
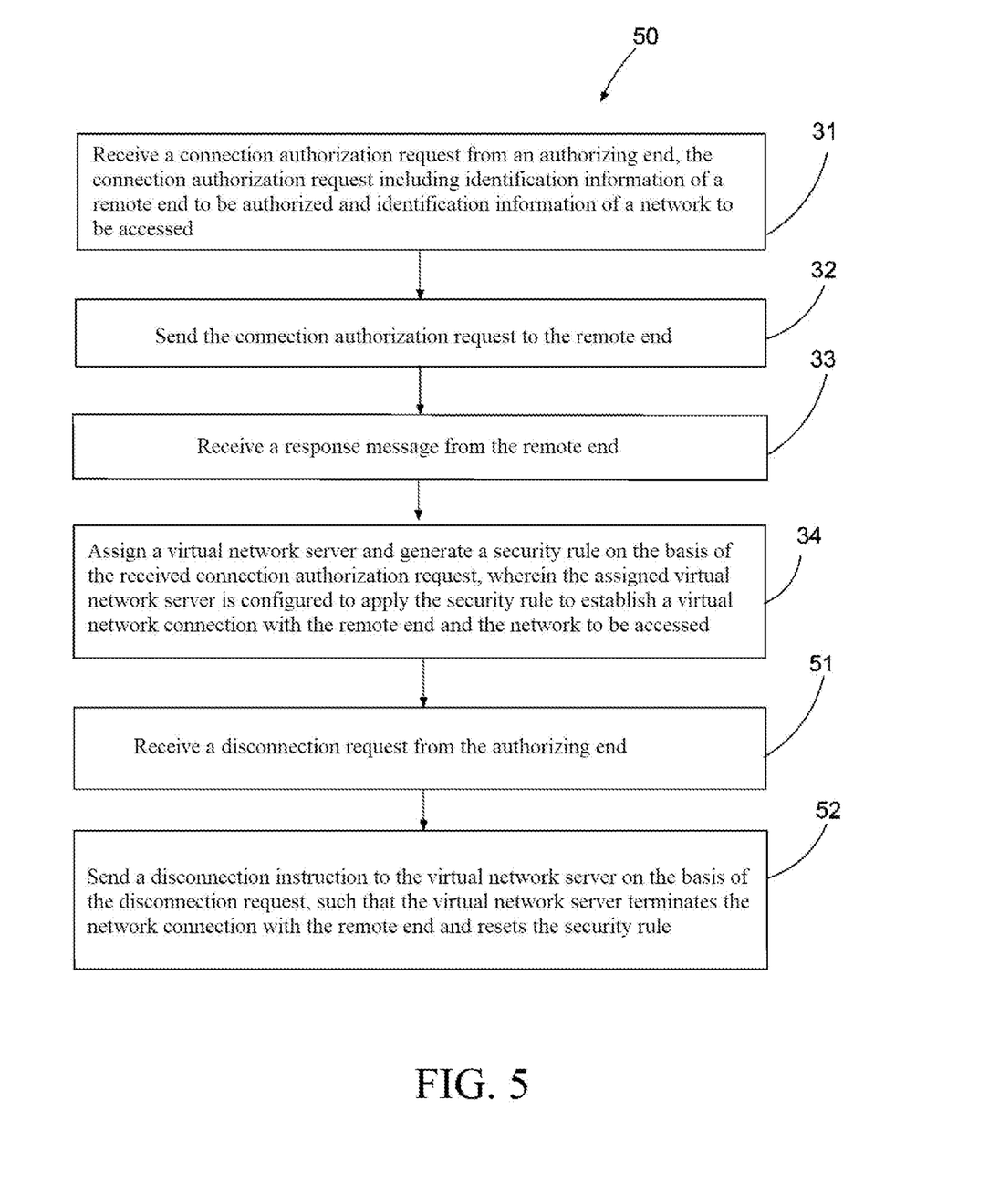
FIG. 5 shows a flowchart of a network access authentication method according to yet another embodiment.

FIG. 5 shows a flowchart 50 of a network access authentication method according to another embodiment, the method including operation 31-34, and further including the following operations:

Operation 51 may include receiving a connection termination request from the authorizing end 15; and Operation 52 may include sending a connection termination instruction to the virtual network server 28 on the basis of the connection termination request, such that the virtual network server 28 terminates the network connection with the remote end 16 and resets the security rule.

The "module" described herein may be implemented by software, hardware, or a combination of software and hardware. For example, in accordance with some aspects of the embodiments of the present invention, the "module" described herein may be implemented as a computer program module.

Although the operations of the method in accordance with specific embodiments of the present disclosure are shown as functional blocks, the order of the functional blocks and the separation of actions between the functional blocks shown in FIG. 3 to FIG. 5 are not intended to be limiting. For example, the functional blocks may be performed in a different order, and an action associated with one functional block may be combined with one or a plurality of other functional blocks or may be subdivided into a plurality of functional blocks.

An embodiment of the present disclosure further provides a computer-readable storage medium. The computer-readable storage medium stores one or more instructions, and the one or more instructions, when executed by a processor, implement the network access authentication method according to the various embodiments described above.

Figure 6:
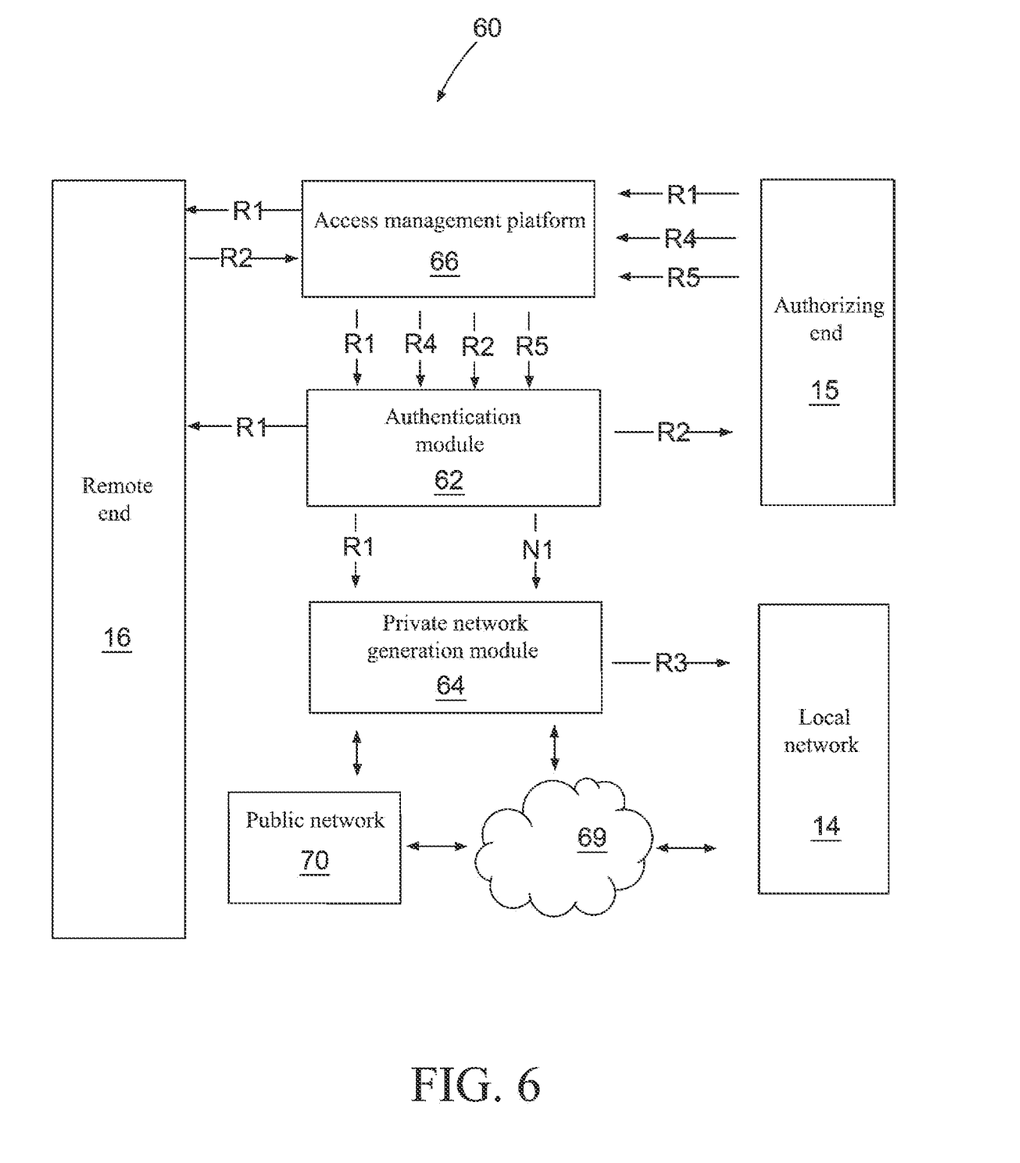
FIG. 6 shows a schematic structural block diagram of a virtual private network according to an embodiment.

FIG. 6 shows a virtual private network (VPN) 60 according to another embodiment, which may be used to establish a virtual private network 69 by means of a public network (e.g., the Internet) 70, such that the remote end 16 can access the local network 14 through the virtual private network 69.

The virtual private network 60 may include a server that connects the public network 70 and the local network 14. The server may be established by hardware, software, or a combination of hardware and software.

The virtual private network 60 may include an authentication module 62 and a private network generation module 64. The authentication module 62 and the private network generation module 64 may be integrated in the server.

Similar to the authentication module 22, the authentication module 62 may be configured to receive a connection authorization request R1 from the authorizing end 15, send the connection authorization request R1 to the remote end 16, and receive a response message R2 from the remote end 16, the connection authorization request R1 including identification information of the remote end 16 and identification information of the local network 14.

In one embodiment, the authentication module 62 may receive the connection authorization request R1 from the authorizing end 15 through an access management platform 66. The access management platform 66 may include a VPN user interface disposed based on a public web browser or application. For example, a user at the authorizing end 15 may access the access management platform through the browser or application, and input a command related to the connection authorization request R1 into the access management platform 66, so as to generate the connection authorization request R1 at the management platform 66. The management platform then sends the generated connection authorization request R1 to the authentication module 64 for relevant authentication.

The connection authorization request R1 may further include access time information, the access time information including at least one of a start time and an end time between which the remote end 16 is allowed to have a virtual network connection to the network to be accessed (the local network 14).

The authentication module 62 may be further configured to send the received connection authorization request R1 to the remote end 16. Similar to the previous embodiments, the authentication module 62 may transmit, via the access management platform 66, the received connection authorization request R1 to a remote end user who is also accessing the access management platform.

In other embodiments, the authentication module 62 may also directly send the connection authorization request R1 (e.g., via one or more of a mail, an SMS short message, and intra-website information) to the remote end 16.

The authentication module 62 may be further configured to receive the response message R2 from the remote end 16. In one embodiment, the authentication module 62 may receive the response message R2 through the access management platform 66. In one exemplary scenario, a user at the remote end 16, after receiving the connection authorization request R1, may access the access management platform 66 to make a response. The response message R2 may indicate consent to remotely accessing the local network 14 in accordance with the specifics of the connection authorization request R1.

The private network generation module 64 may be configured to receive the connection authorization request R1 sent from the authentication module 62 and to generate the virtual private network 69 and a security rule R3 on the basis of the connection authorization request R1. The virtual private network 69 may be a private network channel established between the public network and the local network 14. In addition, the virtual private network 69 applies the security rule R3 to establish a virtual network connection with the remote end 16 and the network to be accessed (e.g., the local network 14). For example, the private network generation module 64 instructs the edge device 142 of the network to be accessed 14 to update a network configuration (such as configuring an access port and routing information) in accordance with the security rule R3.

In one example, the private network generation module 64 receives a plurality of connection authorization requests sent by the authentication module 62, and generates a connection authorization request list. The private network generation module 64 may establish a plurality of private network channels on the basis of the connection authorization request list.

Similarly, the "security rule" may include a rule that needs to be followed when the edge device 142 of the local network 14 accesses the virtual network, and may further include a rule that needs to be followed when the remote end 16 is allowed to access the virtual network. The security rule may include at least part of the content of the connection authorization request R1, and may further include network configuration information. For example, the security rule R3 may include an IP address of the remote end, an access port of the local network 14, routing information corresponding to the computer device 124 that needs to be connected, etc. The security rule R3 may further include information of the time during which the remote end 16 is allowed to access the local network, e.g., a time period during which the remote end 16 is allowed to access the network to be accessed.

In order to further improve the security of network connections, the authentication module 62 may be further configured to receive an access permission instruction R4 from the authorizing end 15. The access permission instruction R4 can be generated by the authorizing end 15 when accessing the access management platform 66. The authentication module 62 may be configured to send the access connection request R1 to the private network generation module 64 when the authentication module receives the access permission instruction R4 from the authorizing end 15.

In one example, the access management platform 66 is configured to add a currently received access permission instruction R4 as an instruction tag to an earlier received access connection request R1, so as to send the access connection request R1 provided with the instruction tag to the private network generation module 64.

Further, the authentication module 62 may be configured to receive the above access permission instruction R4 only within a particular time (e.g., five minutes) before an access start time of the connection authorization request.

In one embodiment, after the private virtual network 69 is generated and the relevant module updates the network configuration on the basis of the security rule R3, the authentication module 62 generates access authentication information for accessing the local network 14, so as to allow the remote end 16 to access the local network 14 via the private virtual network 69 on the basis of the access authentication information. The access authentication information may include detailed information for accessing the local network 14, such as routing information.

The authentication module 62 may further send the generated access authentication information to the remote end 16 in the form of, for example, a mail, an SMS short message, intra-website information, or the like. In one example, the authentication module 62 sends the access authentication information to the access management platform 66, such that when accessing the access management platform 26, a user at the remote end 16 automatically acquires detailed information of remote access, and remotely accesses the local network to be accessed 14 on the basis of the detailed information.

In other embodiments, the authentication module 62 is further configured to receive a connection termination request R5 from the authorizing end 15 through the access management platform 66. The authentication module 62 deletes an authorized connection authentication already generated on the basis of the received connection termination request and sends a connection termination instruction N1 to the private network generation module 64. The private network generation module 64 terminates the network connections to the remote end 16 and the local network on the basis of the connection termination instruction N1, and resets/deletes the security rule R3.

Upon termination of connection, the private network generation module 64 may report to the authentication module 62 a status update message indicating that the connection has been terminated. The authentication module 62 further sends the received status update message to the access management platform 66 such that the authorizing end 15 and the remote end 16 can acquire the current remote connection status by accessing the access management platform 26.

At the same time, the authentication module 62 may further send a notification of the remote connection termination to the remote end 16 and the authorizing end 15 via one or more of a mail, an SMS short message, and intra-website information.

In the above embodiments, the authentication module having an authorizing-end authentication mode and the private network generation module for a VPN are integrated and communicate with each other, thereby improving the security of VPN authentication.

The respective modules/platforms in the embodiments of the present disclosure, such as the authentication module 22/62, the resource scheduling module 24, the private network generation module 64, the access management platform 26/66, etc., may separately or collectively include a computer processor and a storage medium. The storage medium records a predetermined data processing program to be executed by the computer processor. For example, the storage medium may store programs used to implement access authentication, remote interaction, etc., according to the embodiments of the present invention. For example, the storage medium may store a program used to implement the network access authentication method according to the embodiments of the present invention. The storage medium may include, for example, a ROM, a floppy disk, a hard disk, an optical disk, a magneto-optical disk, a CD-ROM, or a non-volatile memory card.

While the present disclosure has been described in detail with reference to the specific embodiments, it will be understood by those skilled in the art that many modifications and variations can be made to the present disclosure. Therefore, it should be understood that the claims are intended to cover all such modifications and variations within the true spirit and scope of the present disclosure.

The invention claimed is:

1. A network access authentication method, comprising:
   receiving a connection authorization request from an authorizing device, the connection authorization request comprising identification information of a remote device to be authorized and identification information of a network to be accessed;
   sending the connection authorization request to the remote device;
   receiving a response message from the remote device; and assigning a virtual network server and generating a security rule on the basis of the connection authorization request, wherein the assigned virtual network server is configured to apply the security rule to establish a virtual network connection with the remote device and the network to be accessed between the remote device and the network to be accessed, wherein the remote device is pre-authorized and configured to make access control decisions independently of the authorizing device, and wherein the authorizing device transmits a connection termination instruction to the assigned virtual network server such that the assigned virtual network server terminates the virtual network connection with the remote device.

2. The network access authentication method according to claim 1, wherein the connection authorization request further comprises access time information, the access time information comprising at least one of a start time and an end time between which the remote device is allowed to have a virtual network connection to the network to be accessed.

3. The network access authentication method according to claim 1, wherein the identification information of the network to be accessed comprises at least one of identity information of an authorizing party, attribute information of the network to be accessed, and information of a data providing device in the network to be accessed.

4. The network access authentication method according to claim 3, wherein the data providing device comprises at least one of a medical imaging device, a computer device interacting with the medical imaging device, and an edge device.

5. The network access authentication method according to claim 1, wherein sending the connection authorization request to the remote device comprises:
parsing the connection authorization request; and
sending the parsed connection authorization request to the remote device via one or more of a mail, an SMS short message, and intra-website information.

6. The network access authentication method according to claim 1, further comprising:
instructing an edge device of the network to be accessed to update a network configuration according to the security rule;
receiving, from the edge device, a first confirmation message indicating that the network configuration has been updated;
receiving, from the virtual network server, a second confirmation message indicating that the security rule has been applied; and
sending, to the remote device, access authentication information for accessing the network to be accessed.

7. The network access authentication method according to claim 6, further comprising:
receiving a connection termination request from the authorizing device; and
sending a connection termination instruction to the virtual network server on the basis of the connection termination request, such that the virtual network server terminates the network connection with the remote device.

8. The network access authentication method according to claim 7, wherein
the connection authorization request, the connection termination request, and the response message of the remote device are received and sent through an access management platform based on a web browser or application.

9. A network access authentication system, comprising:
an authentication module configured to: receive a connection authorization request from an authorizing device, send the connection authorization request to a remote device, and receive a response message from the remote device, the connection authorization request comprising identification information of the remote device to be authorized and identification information of a network to be accessed; and
a resource scheduling module configured to: receive the connection authorization request sent by the authentication module, and assign a virtual network server and generate a security rule on the basis of the connection authorization request, wherein the assigned virtual network server is configured to apply the security rule to establish a virtual network connection with the remote device and the network to be accessed,
wherein the remote device is pre-authorized and configured to make access control decisions independently of the authentication module, and wherein the authorizing device transmits a connection termination instruction to the assigned virtual network server such that the assigned virtual network server terminates the virtual network connection with the remote device.

10. The network access authentication system according to claim 9, wherein
the connection authorization request further comprises access time information, the access time information comprising at least one of a start time and an end time between which the remote device is allowed to have a virtual network connection to the network to be accessed.

11. The network access authentication system according to claim 9, wherein the identification information of the network to be accessed comprises at least one of identity information of an authorizing party, attribute information of the network to be accessed, and information of a data providing device in the network to be accessed.

12. The network access authentication system according to claim 11, wherein the data providing device comprises at least one of a medical imaging device, a computer device interacting with the medical imaging device, and an edge device.

13. The network access authentication system according to claim 9, further comprising an access management platform established based on a web browser or application, wherein the authentication module is configured to: receive the connection authorization request from the authorizing device through the access management platform, send the connection authorization request to the remote device, and receive the response message from the remote device.

14. The network access authentication system according to claim 13, wherein the authentication module comprises:
a message parsing unit configured to: parse the connection authorization request from the authorizing device, and send the parsed connection authorization request to the remote device via one or more of an email, an SMS short message, and intra-website information.

15. The network access authentication system according to claim 13, wherein the resource scheduling module comprises:
a first task unit configured to instruct an edge device of the network to be accessed to update a network configuration according to the security rule, and receive, from the edge device, a first confirmation message indicating that the network configuration has been updated; and a second task unit configured to receive, from the virtual network server, a second confirmation message indicating that the security rule has been applied; and a third task unit configured to send the first confirmation message and the second confirmation message to the authentication module; and the authentication module is configured to generate, after receiving the first confirmation message and the second confirmation message, access authentication information for accessing the network to be accessed.

16. The network access authentication system according to claim 15, wherein the authentication module is further configured to:

receive a connection termination request from the authorizing device through the access management platform; and send a connection termination instruction to the resource scheduling module on the basis of the connection termination request, such that the resource scheduling module sends the connection termination instruction to the assigned virtual network server, and the virtual network server accordingly terminates the network connection with the remote device.

17. A virtual private network, comprising:

an authentication module configured to: receive a connection authorization request from an authorizing device, send the connection authorization request to a remote device, and receive a response message from the remote device, the connection authorization request comprising identification information of the remote device and identification information of a local network; and a private network generation module configured to: receive the connection authorization request sent by the authentication module, generate a security rule on the basis of the connection authorization request, and apply the security rule to establish a virtual private network between the remote device and the local network, wherein the remote device is pre-authorized and configured to make access control decisions independently of the authentication module, and wherein the authorizing device transmits a connection termination instruction to the assigned virtual network server such that the assigned virtual network server terminates the virtual network connection with the remote device.

18. The virtual private network according to claim 17, wherein the connection authorization request further comprises access time information, and the access time information comprises at least one of a start time and an end time between which the remote device is allowed to have a virtual network connection to the network to be accessed.

19. The network access authentication method of claim 1, wherein the assigned virtual network server simultaneously terminates the virtual network connection and either resets or deletes the security rule.

\* \* \* \* \*